(12) United States Patent
Johannes et al.

(10) Patent No.: US 7,162,388 B2
(45) Date of Patent: *Jan. 9, 2007

(54) VEHICLE AIR BAG ELECTRICAL SYSTEM

(75) Inventors: Richard A. Johannes, Lake Orion, MI (US); George H. Williamson, Detroit, MI (US); Michael S. Glick, Farmington Hills, MI (US); Richard A. Schmidt, Jr., Redford, MI (US); Matthew G. Major, Shelby Township, MI (US); Phillip G. Seminara, Farndale, OH (US); William R. Lyons, West Bloomfield, MI (US); Cecil Brown, Detroit, MI (US); Glen Sparks, Novi, MI (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/146,496

(22) Filed: Jun. 6, 2005

(65) Prior Publication Data

US 2005/0283333 A1    Dec. 22, 2005

Related U.S. Application Data

(60) Provisional application No. 60/580,860, filed on Jun. 17, 2004.

(51) Int. Cl.
*H01R 13/66* (2006.01)

(52) U.S. Cl. ............... 702/156; 439/620.09; 439/164; 439/336; 439/352; 439/616; 439/620

(58) Field of Classification Search ............... 702/156; 439/620.09, 164, 336, 352, 616, 620
See application file for complete search history.

(56) References Cited

U.S. PATENT DOCUMENTS

| | | | |
|---|---|---|---|
| 4,772,221 A * | 9/1988 | Kozlof | 439/544 |
| 5,099,762 A | 3/1992 | Drapala | 102/202.1 |
| 6,152,775 A | 11/2000 | Pavlovic | 439/620 |
| 6,276,953 B1 | 8/2001 | Gauker et al. | 439/352 |
| 6,362,418 B1 * | 3/2002 | Grandy et al. | 174/36 |
| 6,425,601 B1 * | 7/2002 | Lewis | 280/728.2 |
| 6,799,999 B1 * | 10/2004 | Williamson et al. | 439/676 |
| 2006/0035524 A1 * | 2/2006 | Johannes et al. | 439/620 |

* cited by examiner

*Primary Examiner*—John Barlow
*Assistant Examiner*—Cindy D. Khuu
(74) *Attorney, Agent, or Firm*—Harrington & Smith, LLP

(57) ABSTRACT

A vehicle air bag electrical system including an air bag control module; electrical conductors connected to the control module; an electrical connector connected to the electrical conductors; and a filter circuit coupled to the electrical conductors. The filter circuit includes a plurality of capacitors provided as a module. The electrical connector is adapted to be connected to an air bag gas initiator.

19 Claims, 15 Drawing Sheets

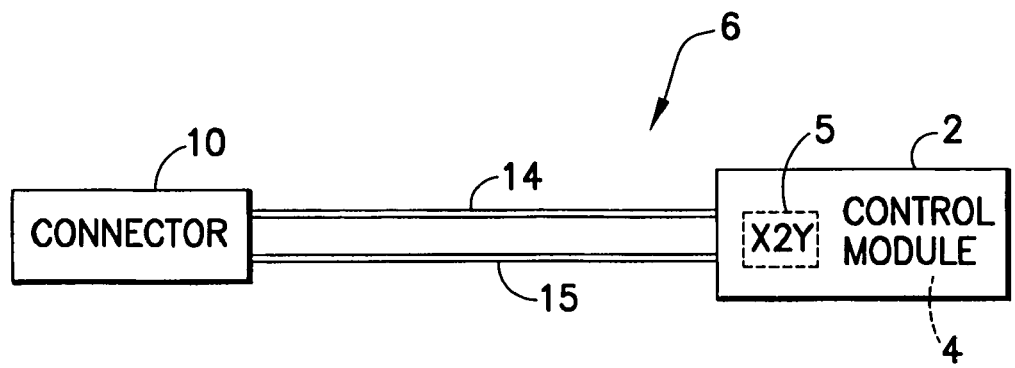
FIG.10
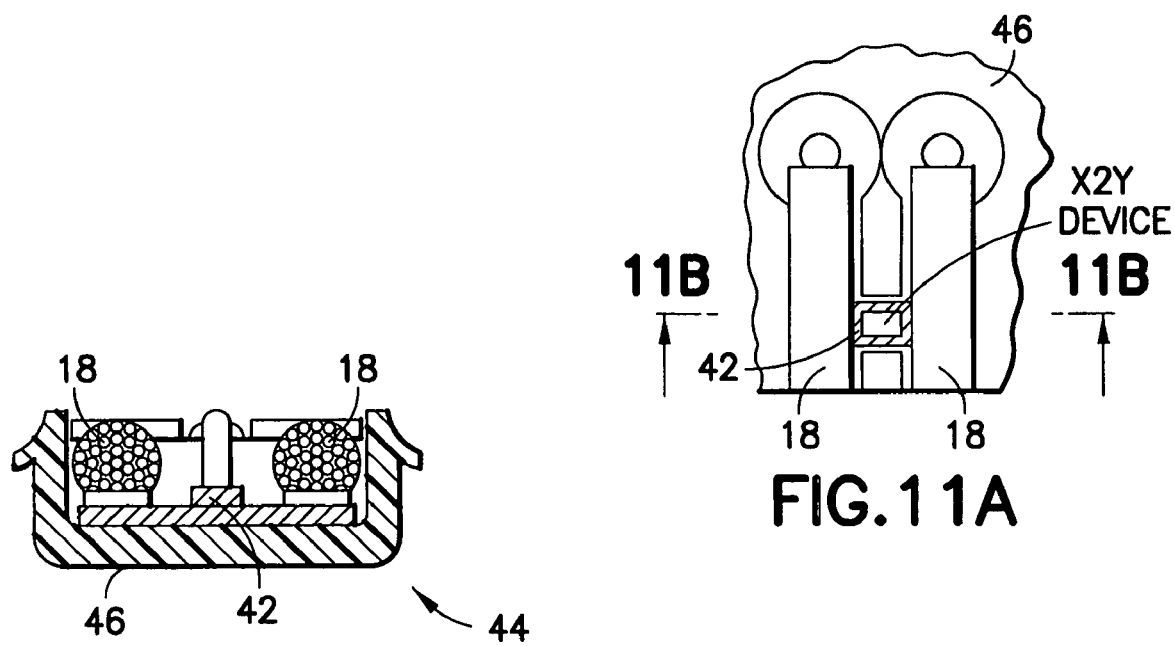
FIG.11A
FIG.11B
FIG.11C

VEHICLE AIR BAG ELECTRICAL SYSTEM

CROSS REFERENCE TO RELATED APPLICATION

This application claims the benefit under 35 U.S.C. §119 (e) of U.S. Provisional Patent Application No. 60/580,860 filed Jun. 17, 2004 which is hereby incorporated by reference in its entirety.

BACKGROUND OF THE INVENTION

1. Field of the Invention

The present invention relates to a vehicle electrical system and, more particularly, to vehicle air bag electrical system having a filter circuit.

2. Brief Description of Prior Developments

U.S. Pat. No. 5,099,762 discloses an electrostatic discharge immune electric initiator. U.S. Pat. No. 6,276,953 discloses an orientationless squib connector assembly for automotive air bag assemblies. For a filtered connector intended to be used in a small space, such as an automobile air bag connector, increasing the size of the connector is not desired. U.S. Pat. No. 6,152,775, which is hereby incorporated by reference in its entirety, discloses a filtered electrical connector with multiple ferrite members.

Air bag electrical connectors which use ferrite hoods are good for filtering electromagnetic interference around 500 MHz. However, automobiles are now being provided with electronics, such as mobile telephones and Global Positioning System (GPS) devices, which can generate electromagnetic interference in the area of about 2–4 GHz. This electromagnetic interference can induce current in conductors leading to an air bag gas generator and cause an accidental discharge of the gas generator. There is a need to provide an air bag connector which can filter electromagnetic interference above 2 GHz and thereby prevent accidental discharge of an air bag gas generator from such interference.

SUMMARY OF THE INVENTION

In accordance with one aspect of the present invention, a vehicle air bag electrical system is provided comprising an air bag control module; electrical conductors connected to the control module; an electrical connector connected to the electrical conductors, wherein the electrical connector is adapted to be connected to an air bag gas initiator; and a filter circuit coupled to the electrical conductors. The filter circuit comprises a module having a plurality of capacitors.

In accordance with another aspect of the present invention, a vehicle air bag electrical connector is provided comprising a housing; electrical contact terminals connected to the housing; and a filter circuit in the housing which is electrically coupled to at least one of the electrical contact terminals. The filter circuit comprises a module with a plurality of capacitors.

In accordance with another aspect of the present invention, a vehicle air bag electrical connector is provided comprising a housing; electrical contact terminals connected to the housing; and a filter assembly in the housing, wherein the filter assembly comprises a filter circuit module comprising a plurality of capacitors, and means for electrically coupling the filter circuit module to at least one electrical conductor connected to at least one of the electrical contact terminals.

BRIEF DESCRIPTION OF THE DRAWINGS

The foregoing aspects and other features of the present invention are explained in the following description, taken in connection with the accompanying drawings, wherein:

FIG. 10 is a diagram similar to FIG. 1 of an alternate embodiment of a vehicle air bag electrical system incorporating features of the present invention;

FIG. 11A–11C are views of an alternate embodiment of the present invention with a filter assembly in the air bag electrical connector;

DETAILED DESCRIPTION OF THE PREFERRED EMBODIMENTS

Figure 1:
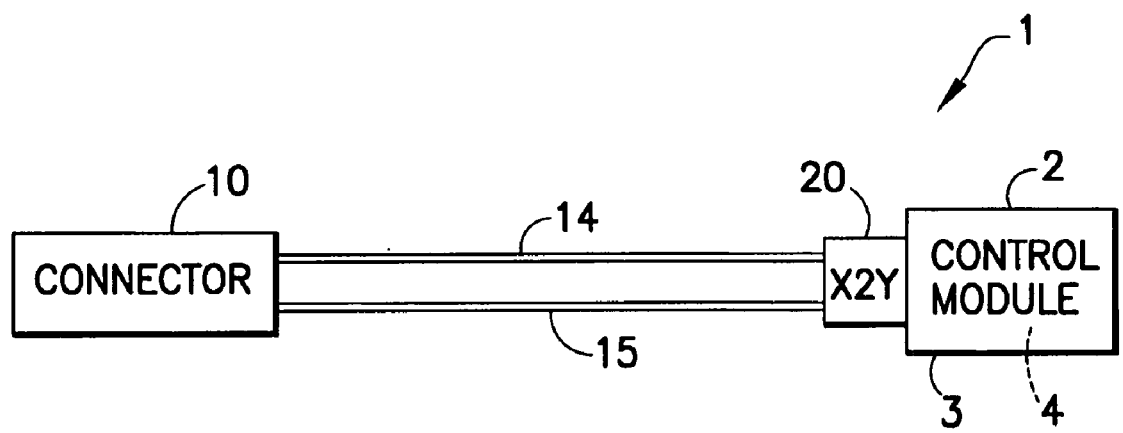
FIG. 1 is a diagram of a vehicle air bag electrical system incorporating features of the present invention.

Referring to FIG. 1, there is shown a simplified diagram of a vehicle air bag electrical system 1 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

Figure 2:
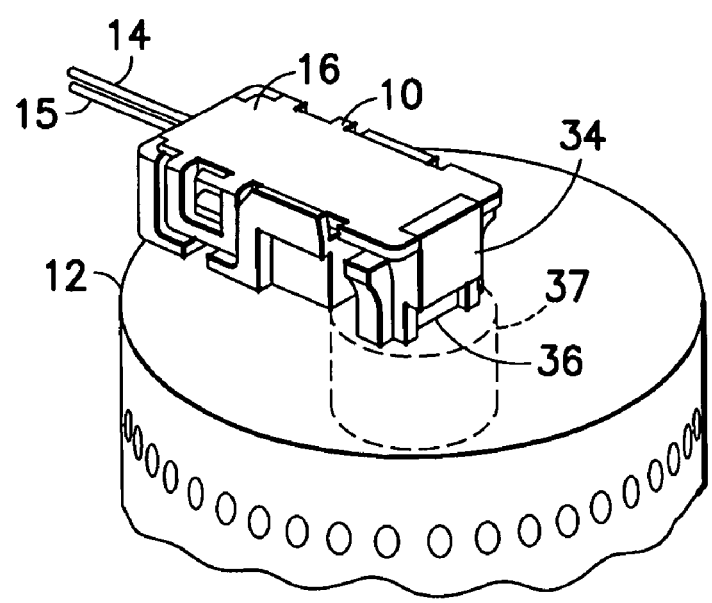
FIG. 2 is a perspective view of the electrical connector shown in FIG. 1 attached to an air bag gas generator.
Figure 3:
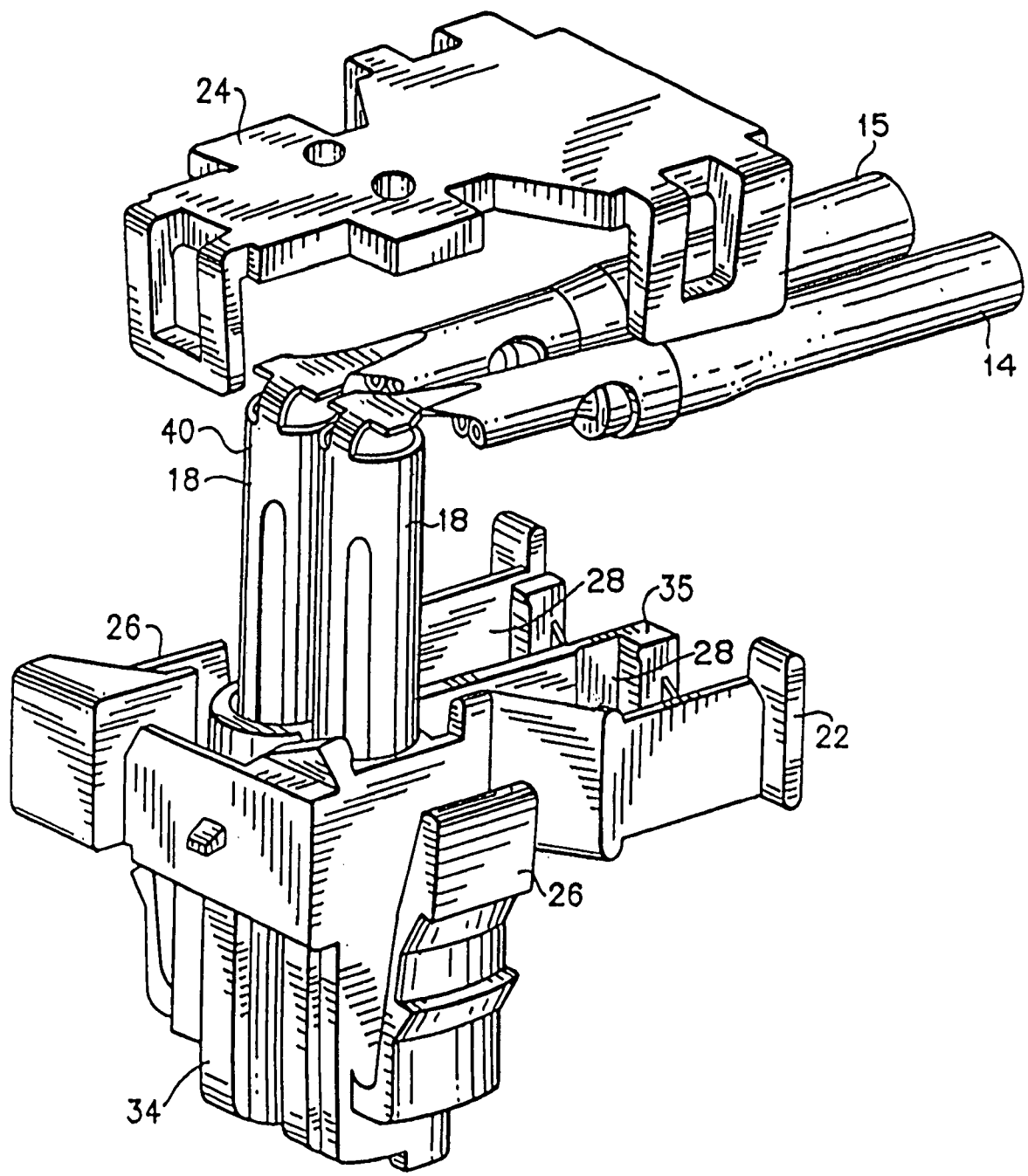
FIG. 3 is an exploded perspective view of the electrical connector shown in FIG. 2.
Figure 4:
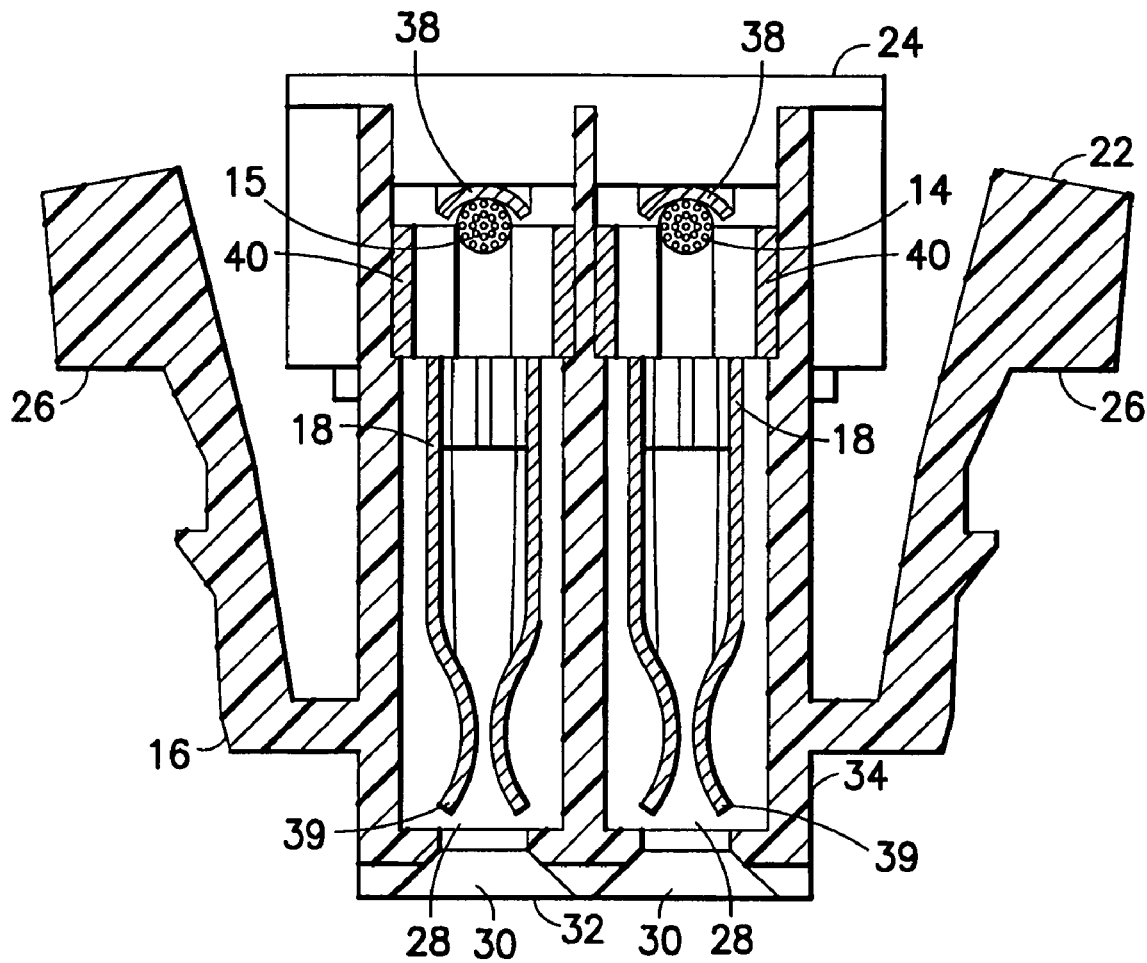
FIG. 4 is a cross-sectional view of the electrical connector shown in FIG. 2.

Referring to FIG. 2, there is shown a perspective view of the electrical connector 10 shown attached to an air bag gas generator 12. In alternate embodiments, the connector 10 could be attached to any suitable type of gas generator or, to any other type of electrical or electronic component. The connector 10, in this embodiment, is for use in connecting electrical conductors 14, 15 with an initiator 37 in the air bag gas generator 12. Referring also to FIGS. 3 and 4, the connector 10 generally comprises a housing 16 and electrical contact terminals 18. The connector 10 does not include prior art ferrite hoods or tubes. Instead, a filter assembly 20 (see FIG. 1) is provided which is intended to replace the ferrite hoods. However, in alternate embodiments, the system 1 could additionally comprise one or more ferrite hoods to provide additional filtering. The filter assembly 20 is provided at an air bag control module 2 of the system 1.

The control module 2 comprises a housing 3 and electronic components 4, such as a printed circuit board, inside the housing. The electronic components 4 are coupled to sensors (not shown) around the vehicle. The sensors can signal a vehicle collision to the electronic components 4. In the embodiment shown, the filter assembly 20 is directly connected to an exterior side of the control module housing 4. Thus, the filter assembly 2 can be added to a conventional control module without having to modify the control module except to providing a connection point for the filter assembly 20.

The conductors 14, 15 are electrically coupled to the electronic components 4 inside the control module 2. Thus, the control module 2 can send a signal via the conductors 14, 15 to the electrical connector 10 to actuate the gas generator 12. The filter assembly 20 can be connected between the electronic components 4 and the conductors 14, 15, or could be merely coupled to the conductors 14, 15. The filter assembly 20 could be directly connected to both the conductors 14, 15 or merely one of the conductors.

Figure 5:
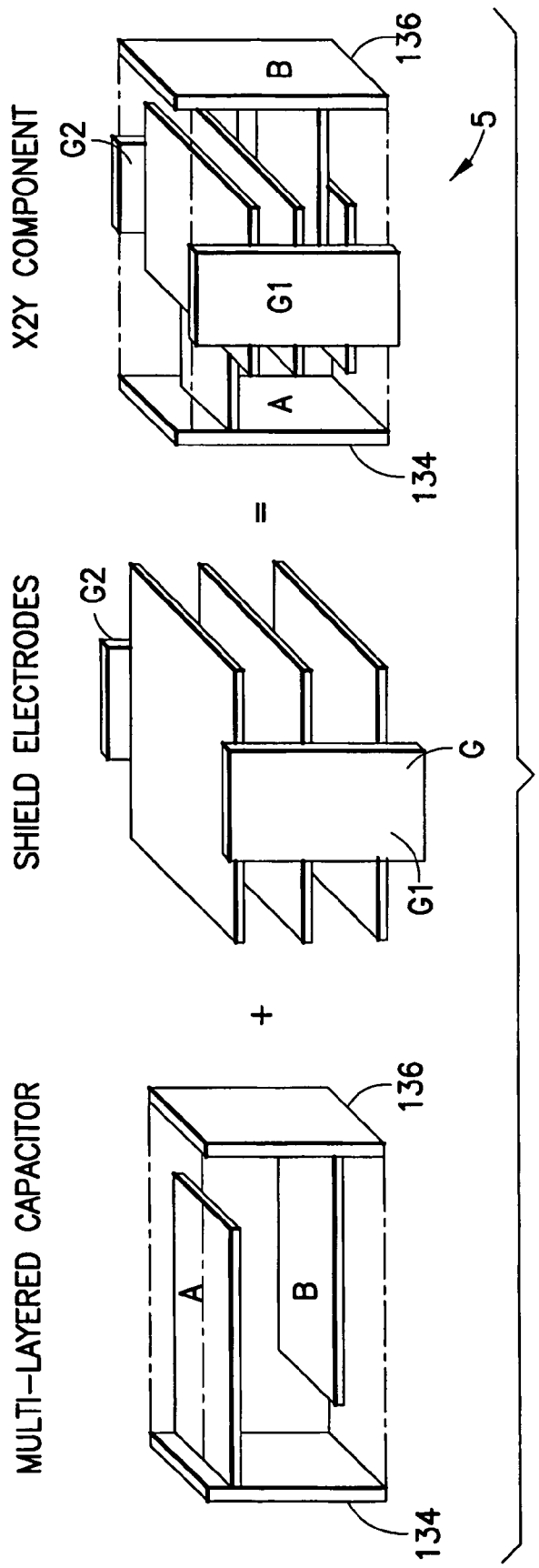
FIG. 5 is a diagram illustration components of an X2Y filter circuit.

The filter assembly 20 preferably comprises multiple capacitors. In a preferred embodiment, the filter circuit comprises an X2Y module or filter circuit manufactured and sold by X2Y Attenuators, LLC of Farmington Hills, Mich. In a preferred embodiment the filter circuit comprises two groups of capacitors. The first group of capacitors comprises two capacitors connected in series. The second group of capacitors comprises a single capacitor. The first group of capacitors is connected in parallel with the second group of capacitors. However, in alternate embodiments, the filter circuit could comprise more or less capacitors and the capacitors could be arranged in any suitable type of circuit configuration. As seen in FIG. 5, the X2Y module comprises multi-layered capacitors A, B and shield electrodes G to produce the X2Y module 5. The electrodes G form ground terminals G1 and G2.

Figure 6:
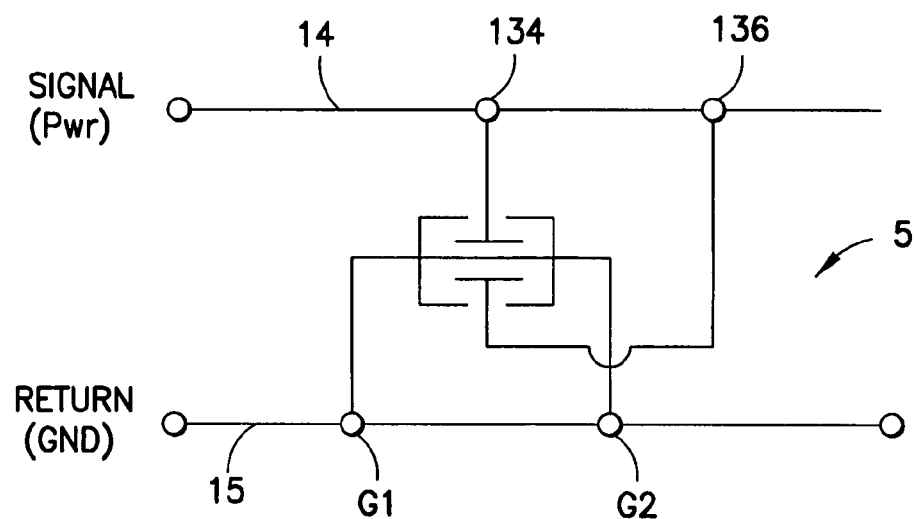
FIG. 6 is a diagram illustrating connection of the X2Y filter circuit shown in FIG. 5 to the two wires shown in FIG. 1.
Figure 7:
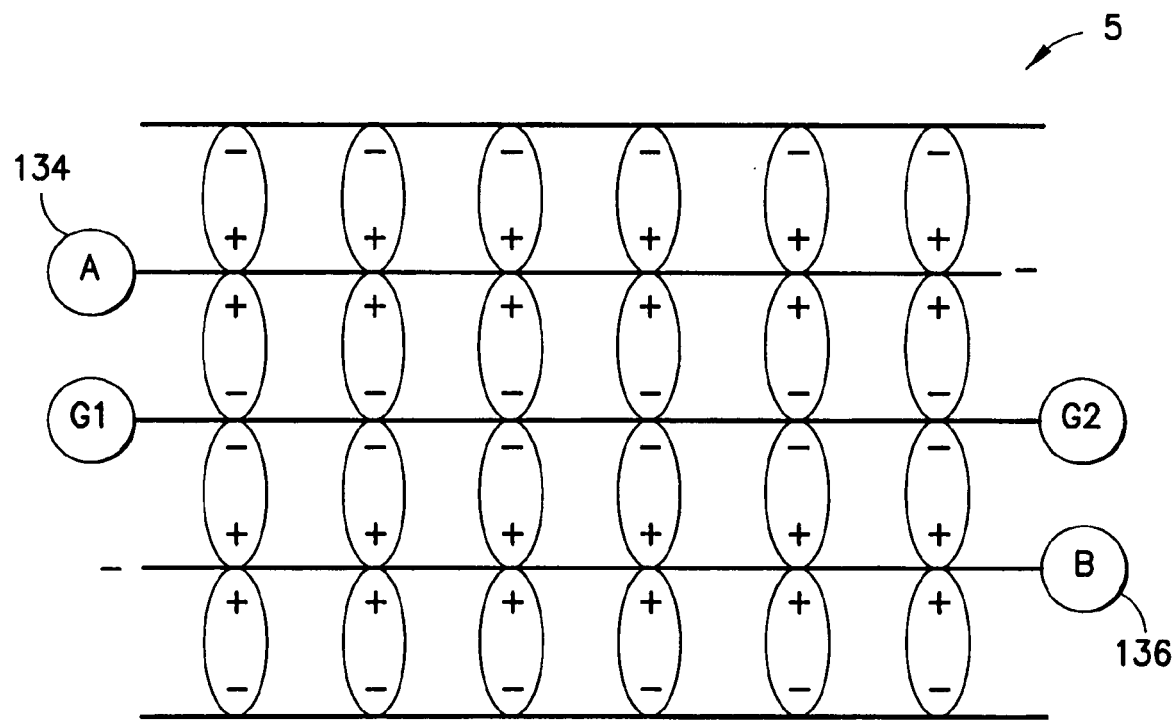
FIG. 7 is a diagram illustrating charges in the X2Y filter circuit shown in FIG. 5.
Figure 8:
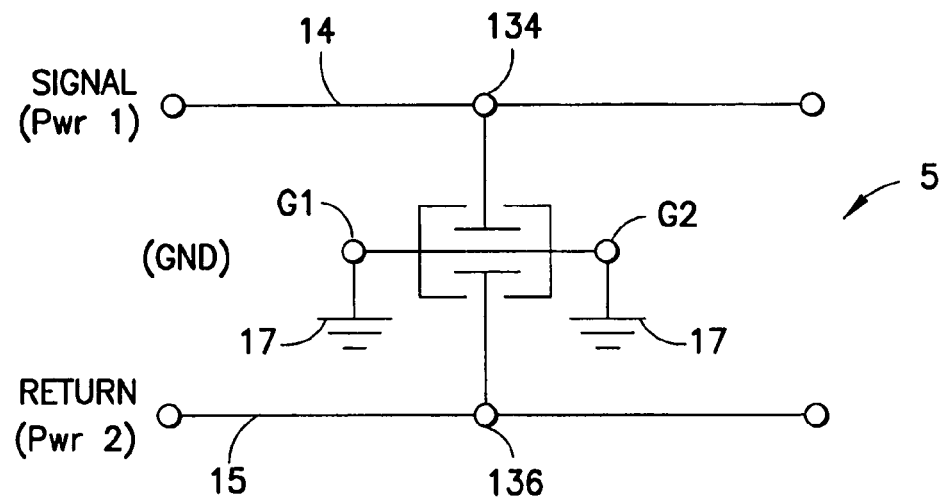
FIG. 8 is a diagram illustrating connection of the X2Y filter circuit shown in FIG. 5 to the two wires and a third conductor as a ground.
Figure 9:
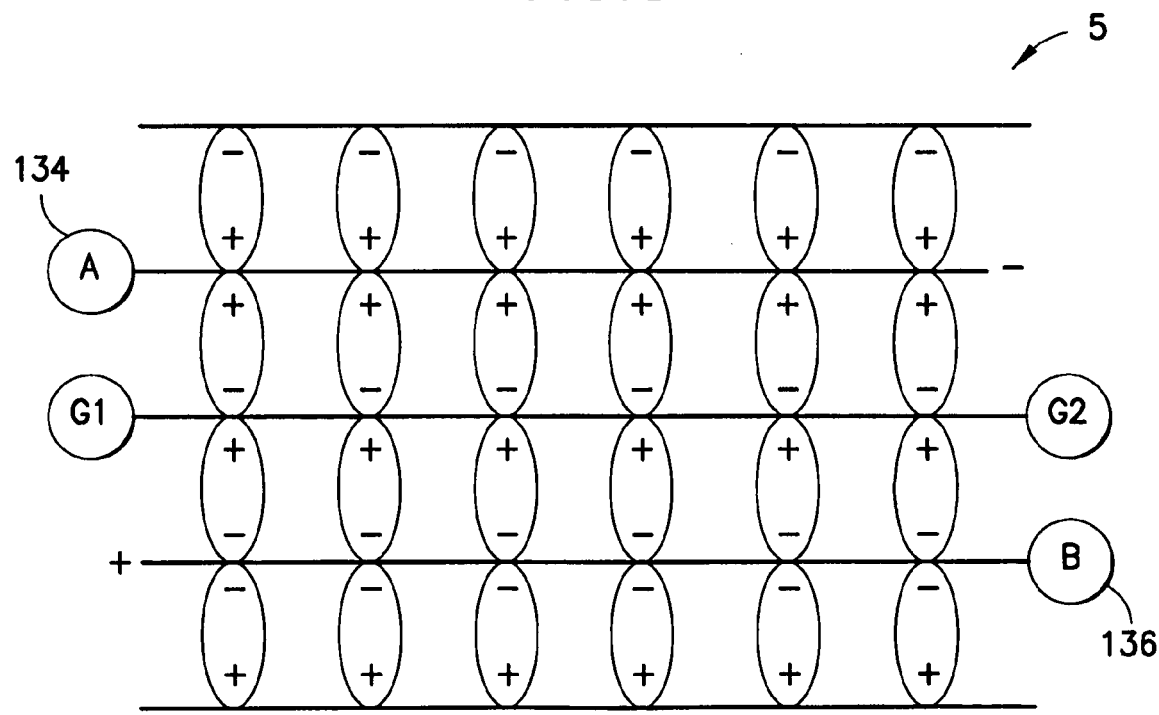
FIG. 9 is a diagram illustrating charges in the X2Y filter circuit shown in FIG. 8.

FIGS. 6 and 7 show diagrams where the X2Y module 5 is used with the two conductors 14, 15 (14 being the signal or power line and 15 being the return or ground line). Alternatively, ground contacts G1, G2 of the filter circuit could be electrically insulated from the wire 15. The other two contacts 134, 136 of the filter circuit are electrically coupled to the wire 14. FIGS. 8 and 9 show diagrams where the X2Y module 5 is used with three conductors; the two conductors 14, 15 and a ground 17. These illustrations are given for descriptive purposes only and should not be considered as limiting.

As noted above, in one embodiment of the present invention, such as in an air bag electrical connector, the ground G of the X2Y chip is not connected to the return wire 15, and the contacts 134, 136 are connected to the power wire 14. The capacitors of the X2Y chip are able to couple with resistance in the wire 14 and parasitic capacitance in the wire 14. This is described in further detail below with reference to FIGS. 17–18.

Unlike a conventional air bag connector having ferrite hoods which are good at filtering electromagnetic induction interference at 500 MHz and below, the system 1 uses a filter assembly 20 to filter electromagnetic interference (EMI), which could otherwise cause an induction current, in the range of about 2–4 GHz or below. In one exemplary embodiment, the filter assembly has been used to filter electromagnetic interference in the range of about 6 GHz and below. Features of the present invention are intended to prevent an EMI discharge at an air bag gas generator 12. This is done by filtering electromagnetic induction current in the electrical wires to the gas generator. Features of the present invention can provide an enhanced EMI suppression capability.

The housing 16 comprises a first housing piece 22 and a second housing piece 24. The two housing pieces are preferably comprised of molded plastic or polymer material. However, in alternate embodiments, any suitable material(s) could be used. In an alternate embodiment, the housing could be comprised of more or less than two housing pieces.

Referring back to FIGS. 3 and 4, the first housing piece 22 includes two cantilevered finger actuatable deflectable latches 26, two separate receiving areas 28, and two holes 30 through a bottom face 32 of the housing into the receiving areas 28. However, in alternate embodiments, the latches 26 might not be provided. Alternatively, any suitable type of latching system could be provided. The housing 16, at the bottom of the front section 34, is adapted to be plugged into a socket 36 (see FIG. 2) of the initiator 37 of the gas generator 12. The latches 26 are adapted to latch with latch surfaces in the socket 36. Optionally, additional connector position assurance means (not shown) can be provided to prevent the connector 10 from accidentally being disengaged from the gas generator 12. The second housing piece 24 is preferably snap lock mounted onto the first housing piece 22 after the contacts 18 and filter assembly 20 are located in the receiving areas 28. However, in alternate embodiments, any suitable type of connection could be provided. In addition, in alternate embodiments, other types of housings or housing components could be provided.

Referring also to FIG. 4, the electrical contact terminals 18 each comprise a first connection section 38, a second female connection section 39, and a positioning section 40. Each first connection section 38 forms a wire connection section for one of the wires 14, 15. However, in alternate embodiments, the terminals 18 could comprise additional sections or sections which are shaped differently from the shapes shown in the drawings, such as co-axial terminals for example. Preferably, the contact terminals 18 are comprised of stamped and formed sheet metal. However, in alternate embodiments, the contact terminals could be comprised of any suitable material(s) and/or could be formed by any suitable contact manufacturing process.

FIG. 10 shows an alternate embodiment of the system 1 shown in FIG. 1. In this embodiment, the system 6 comprises the housing 3 and the electronic components 4 inside the housing. The electronic components 4 are coupled to the sensors (not shown) around the vehicle. In the embodiment shown, the X2Y module 5 is directly connected to the electronic components 4, or one or both of the wires 14, 15, inside the control module housing 4. This embodiment could use the three conductor circuit shown in FIGS. 8 and 9.

The conductors 14, 15 are electrically coupled to the electronic components 4 inside the control module 2. Thus, the control module 2 can send a signal or power via the conductors 14, 15 to the electrical connector 10 to actuate the gas generator 12. The filter assembly 20 can be connected between the electronic components 4 and the conductors 14, 15, or could be merely coupled to the conductors 14, 15. The filter assembly 20 could be directly connected to both the conductors 14, 15 or merely one of the conductors.

Referring now to FIGS. 11A–11C, an alternate embodiment of the present invention is shown. In this embodiment the filter assembly 42 is provided inside the air bag electrical connector 44. The electrical connector 44 comprises a housing 46 and two electrical contact terminals 18 substantially identical to those shown in FIGS. 3 and 4, but with the addition of the filter assembly 42. The filter assembly 42 comprises a printed circuit board 48, two lead frames or contacts 50, and an X2Y module 5. The X2Y module 5 is mounted to the printed circuit board 48. The two lead frames 50 are also mounted to the printed circuit board 48. The printed circuit board 48 provides a circuit path from contacts of X2Y module 5 to the lead frames 50. The lead frames 50 comprise deflectable contact sections 52 which form spring contact areas for contacting the contact terminals 18. The filter assembly 42 is located in a receiving area of the housing 46 and the terminals 18 are placed over the filter assembly 42 inside the receiving area. The printed circuit board with the two cantilever beam contacts are placed in the terminal crimp area of the connector housing to provide contact to the terminals via the terminal crimp sections. A cover (not shown) of the housing is then attached to the housing member 46 to enclosed the terminals 18 and perhaps press the terminals against the deflectable contact sections 52 of the lead frames 50.

Figure 17:
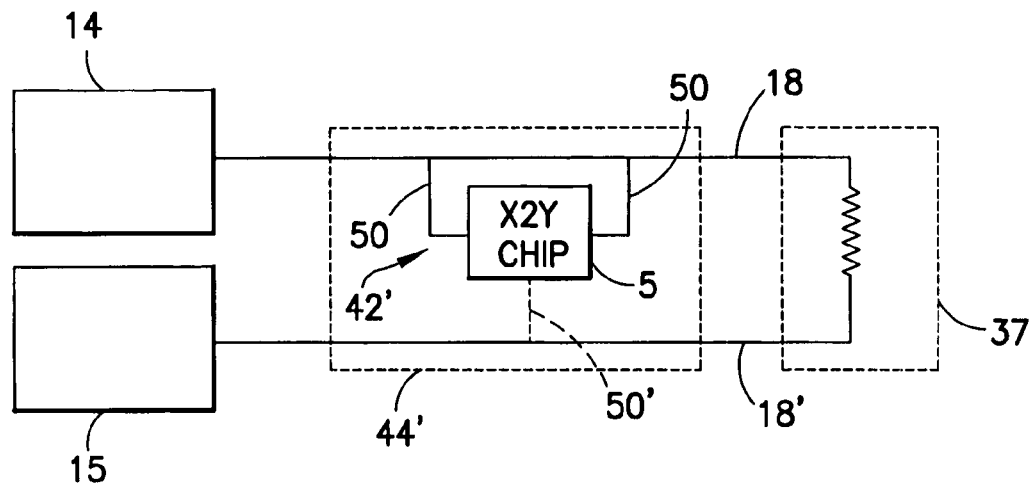
FIG. 17 is a circuit diagram of the connector shown in FIGS. 11A–11C attached to a gas generator initiator.
Figure 17A:
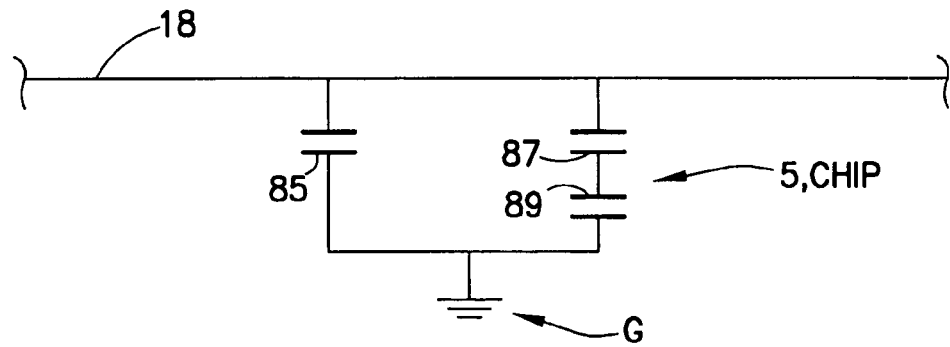
FIG. 17A is a circuit diagram of the chip/module shown in FIG. 17 attached to one terminal.
Figure 18:
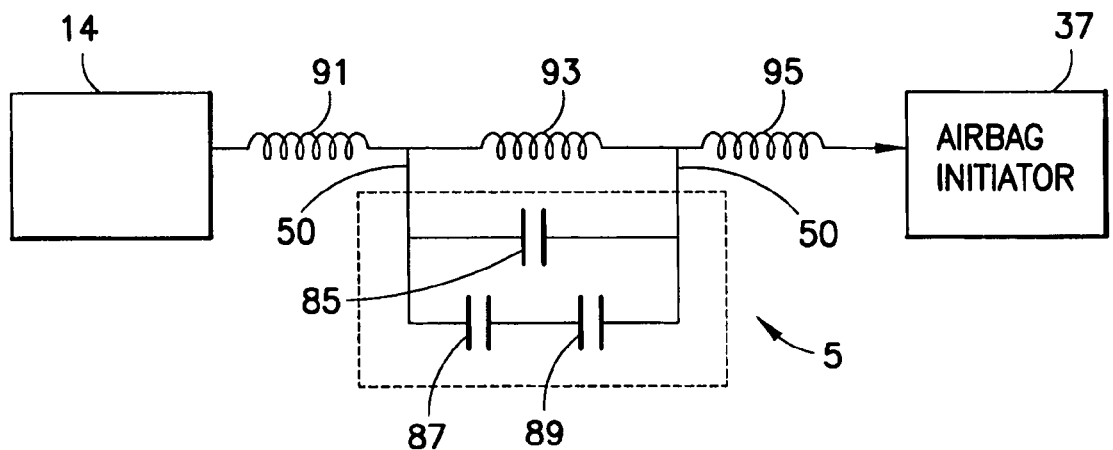
FIG. 18 is a diagrammatic circuit diagram showing the filter circuit of the filter assembly and how it affects induction in one of the terminals.

Referring also to FIGS. 17 and 17a, an alternate embodiment is shown wherein the electrical connector 44' provides a connection between the wires 14, 15 and the gas generator initiator 37. The filter assembly 42' is connected to the electrical path between the wire 14 and the initiator 37 by leads 50 on only one connector terminal 18. Referring also to FIG. 18, the electrical path between the wire 14 and the air bag initiators 37 is susceptible to electromagnetic inductions 91, 93, 95. The filter circuit 5 is connected by the connector leads 50 at the front and rear of one of the induction areas 93. The filter circuit 5 helps to suppress an induction current between the wire 14 and the air bag initiator 37. This helps to suppress an accidental initiation of the initiator 37 from electromagnetic interference.

As seen in FIGS. 17a and 18, in a preferred embodiment the filter circuit 5 comprises two groups of capacitors. The first group of capacitors comprises two capacitors 87, 89 connected in series. The second group of capacitors comprises a capacitor 85. The first group of capacitors is connected in parallel with the second group of capacitors. However, in alternate embodiments, the filter circuit 5 could comprise more or less capacitors and the capacitors could be arranged in any suitable type of circuit configuration. Ground G can be the terminal 18' with lead 50' shown in FIG. 17, or another member (not shown) connected to ground.

Figure 12:
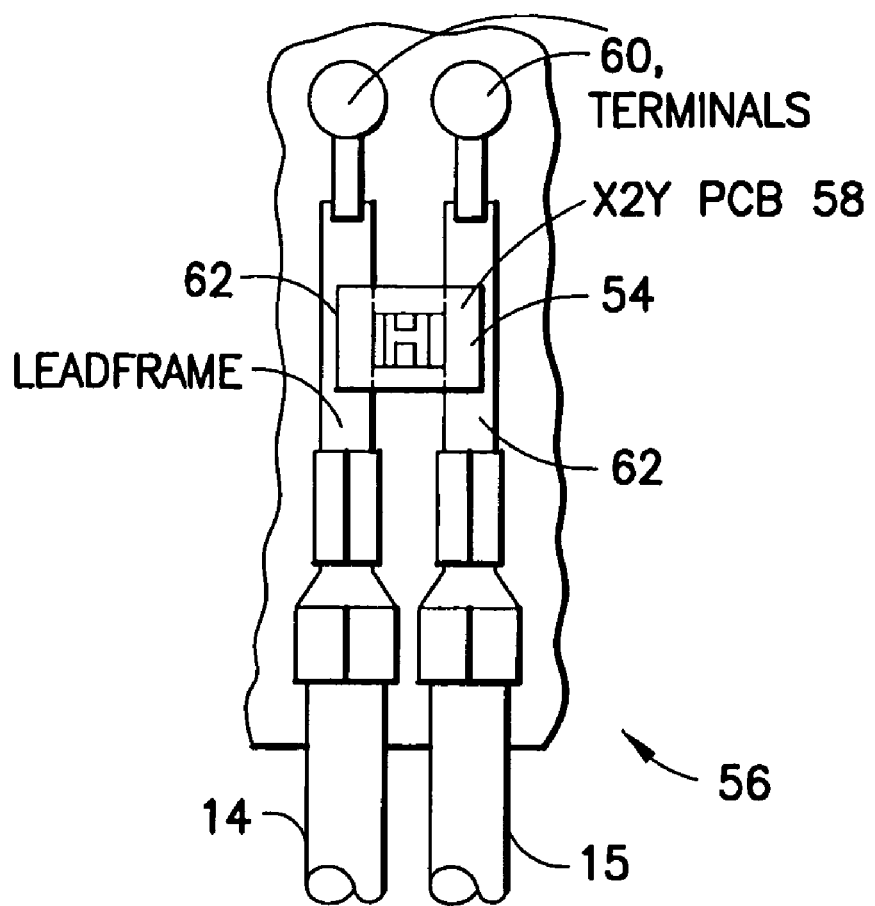
FIG. 12 is a top plan view of another alternate embodiment of an electrical connector incorporating features of the present invention with the housing cover removed.

Referring now to FIG. 12, an alternate embodiment of the present invention is shown. In this embodiment the filter assembly 54 is located inside the air bag electrical connector 56. The filter assembly 54 comprises a printed circuit board 58 and an X2Y module 5. The electrical connector 56 comprises two contact terminals 60. Each contact terminal 60 comprises a deflectable lead frame 62. The deflectable lead frames 62 are adapted to contact contact pads on the printed circuit board 58. The lead frame can be the terminal ground plane and the retainer of the device. Overmolding of a housing component can be provided for insulation. The lead frame can provide connection between the terminals and the printed circuit board. Thus, this embodiment illustrates that the lead frames can be provided on the terminals rather than on the filter assembly.

Figure 14:
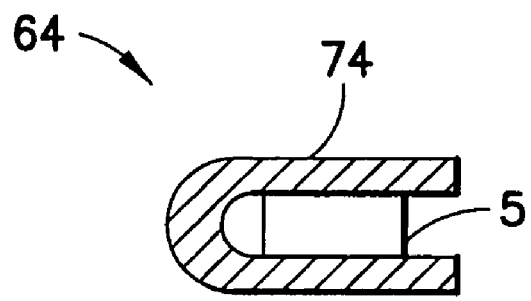
FIG. 14 is a cross sectional view of the filter assembly shown in FIG. 13 taken along line 14—14.
Figure 13:
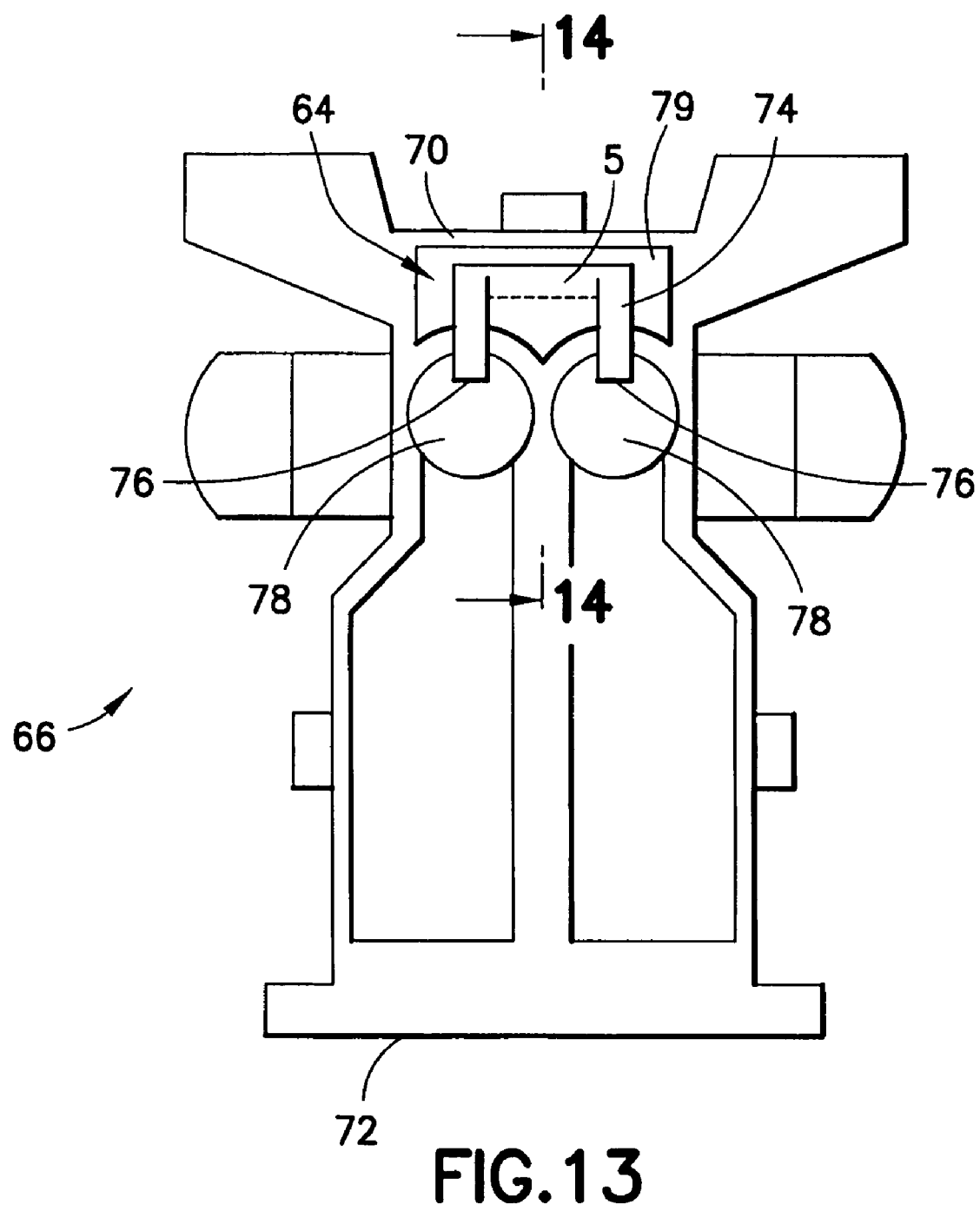
FIG. 13 is a top plan view of another alternate embodiment of an electrical connector incorporating features of the present invention with the housing cover removed.

Referring now to FIGS. 13–14, another alternate embodiment of the present invention is shown. In this embodiment the filter assembly 64 is provided in the air bag electrical connector 66. In this embodiment the filter assembly 64 is located in a front end 68 of the housing 70 which is opposite from a rear end 72 of the housing 70. The electrical conductors 14, 15 (not shown in FIG. 13) extend through the rear end 72 into the housing 70. The filter assembly 64 comprises a filter circuit 5 and a lead frame 74. The lead frame 74 comprises two rearward extending deflectable contact sections 76 which extend into the receiving areas 78 which receive the female contact sections 39 of the terminals 18 (not shown in FIG. 13). The deflectable contact sections 76 can directly contact the female contact sections 39 of the contact terminals 18 when they are inserted into the receiving areas 78. The filter circuit 5 can be located in a material saver open space 79 in the forward portion of the connector housing and provide contact with the terminals by metal strips attached to the device.

Figure 15:
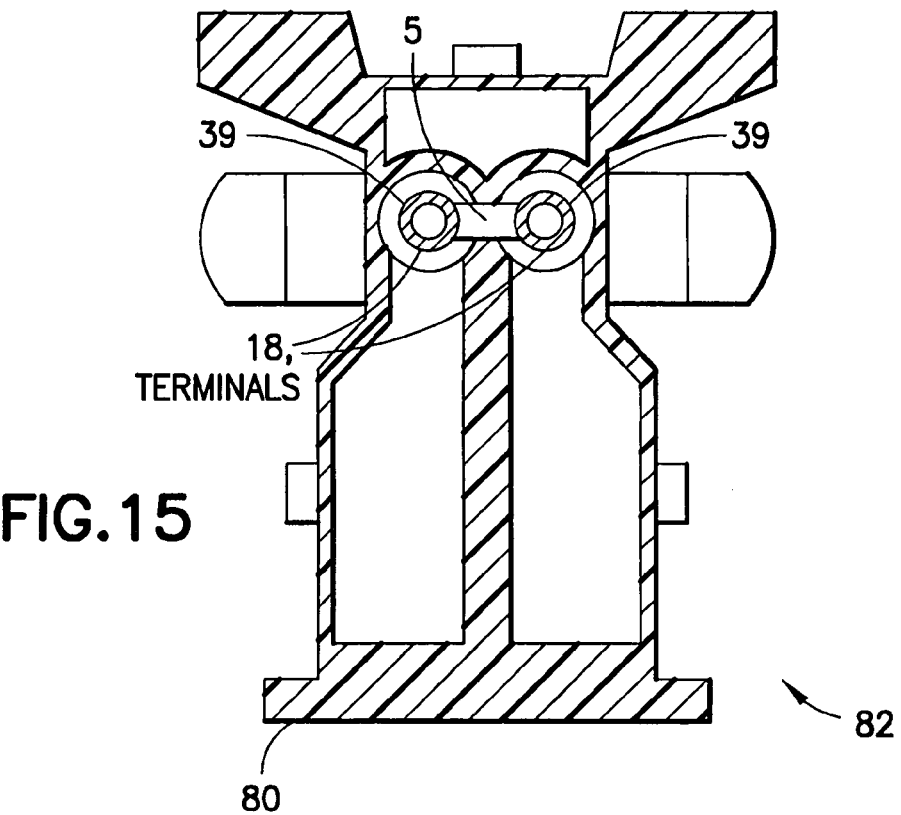
FIG. 15 is a cross sectional view of another alternate embodiment of an electrical connector incorporating features of the present invention with the filter circuit located between female contact sections of the contact terminals.

Referring now to FIG. 15, another alternate embodiment of the present invention is shown. This embodiment comprises a filter circuit 5 located inside the housing 80 of the air bag electrical connector 82. The electrical connector 82 comprises two of the contact terminals 18. The female connection sections 39 of the terminals 18 are located in the front receiving areas 84 of the housing 80. The filter circuit 5 is located between the two front receiving areas 84 and extends into the receiving areas 84. Opposite ends of the filter circuit 5 contact respective ones of the female connection sections 39. This embodiment illustrates that the filter circuit can be provided between the female connection sections of the contact terminals and perhaps without a lead frame.

Figure 16:
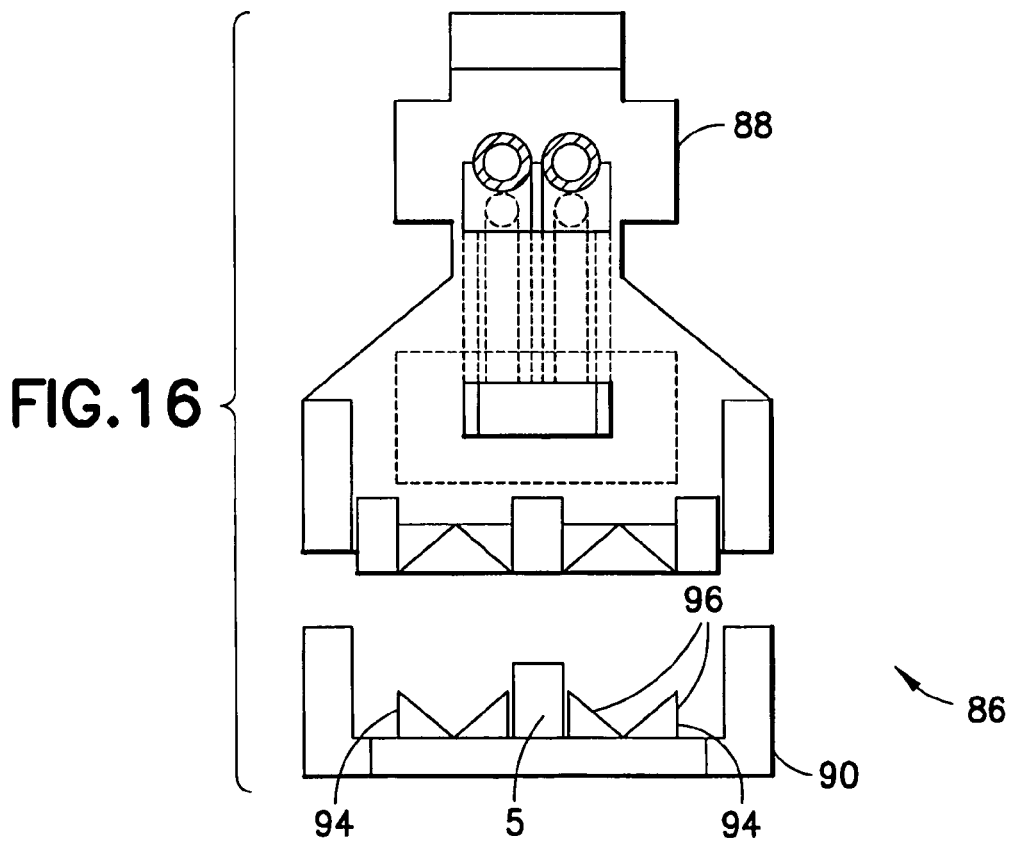
FIG. 16 is an exploded view of another alternate embodiment of an electrical connector incorporating features of the present invention with the filter circuit located in the housing cover.

Referring now to FIGS. 16A and 16B, another alternate embodiment of the present invention is shown. In this embodiment the air bag electrical connector 86 comprises a housing having a base member 88 and a cover member 90. The electrical connector 86 comprises a filter assembly 92 on the cover 90. The filter assembly 92 comprises a filter circuit 5 and electrical contact sections 94. The filter circuit 5 could be connected to the electrical contact sections 94 by a metalized surface on the plastic member forming the cover member 90. The contact sections 94 are adapted to electrically connect to the terminals 18 (not shown in FIG. 16) or the wires 14, 15 (not shown in FIG. 16) when the cover member 90 is mounted on the base member 88. The contact sections 94 could be formed at test probe holes through the cover member 90 which are surrounded by downward plastic or polymer protrusions 96 which are metalized. The probe hole area can be used as the lead frame on the cover to make contact with the terminals. Metalized plastic can be used to attach the filter circuit 5 directly to the plastic and run traces to a terminal flat. The cover member could also be overmolded onto lead frame members and/or the filter circuit 5.

Figure 19:
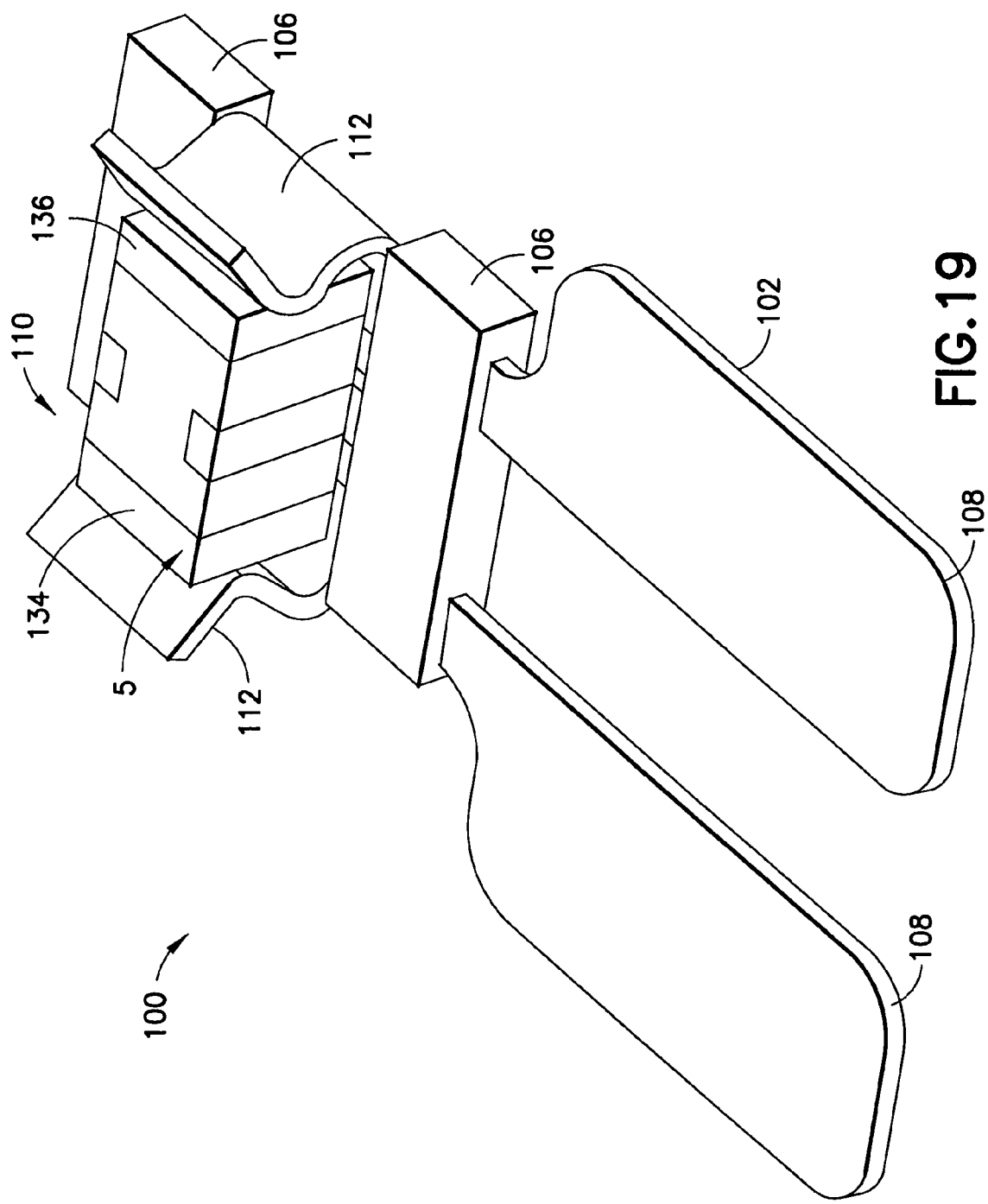
FIG. 19 is a perspective view of an alternate embodiment of a filter assembly incorporating features of the present invention.

Referring now to FIG. 19, an alternate embodiment of a filter assembly is shown. The filter assembly 100 comprises a lead frame 102, a filter circuit 5, and overmolded housing members 106. The lead frame 102 comprises a first end with two termination areas 108 and an opposite second end with a filter circuit mounting area 110. The termination areas 108 can be connected to an electrical connector, or to an electrical conductor(s) such as a wire or contact pad on a printed circuit board. The termination areas 108 could have any suitable size or shape, and more or less than two termination areas could be provided. The filter circuit mounting area 110 has two opposing spring contact arms 112 which are adapted to capture the filter circuit 5 therebetween, such as with a removable connection for example, and make electrical contact with the terminals 134, 136. The housing members 106 are preferably overmolded onto portions of the lead frame 102 in front of and behind the filter circuit mounting area 110.

Figure 20:
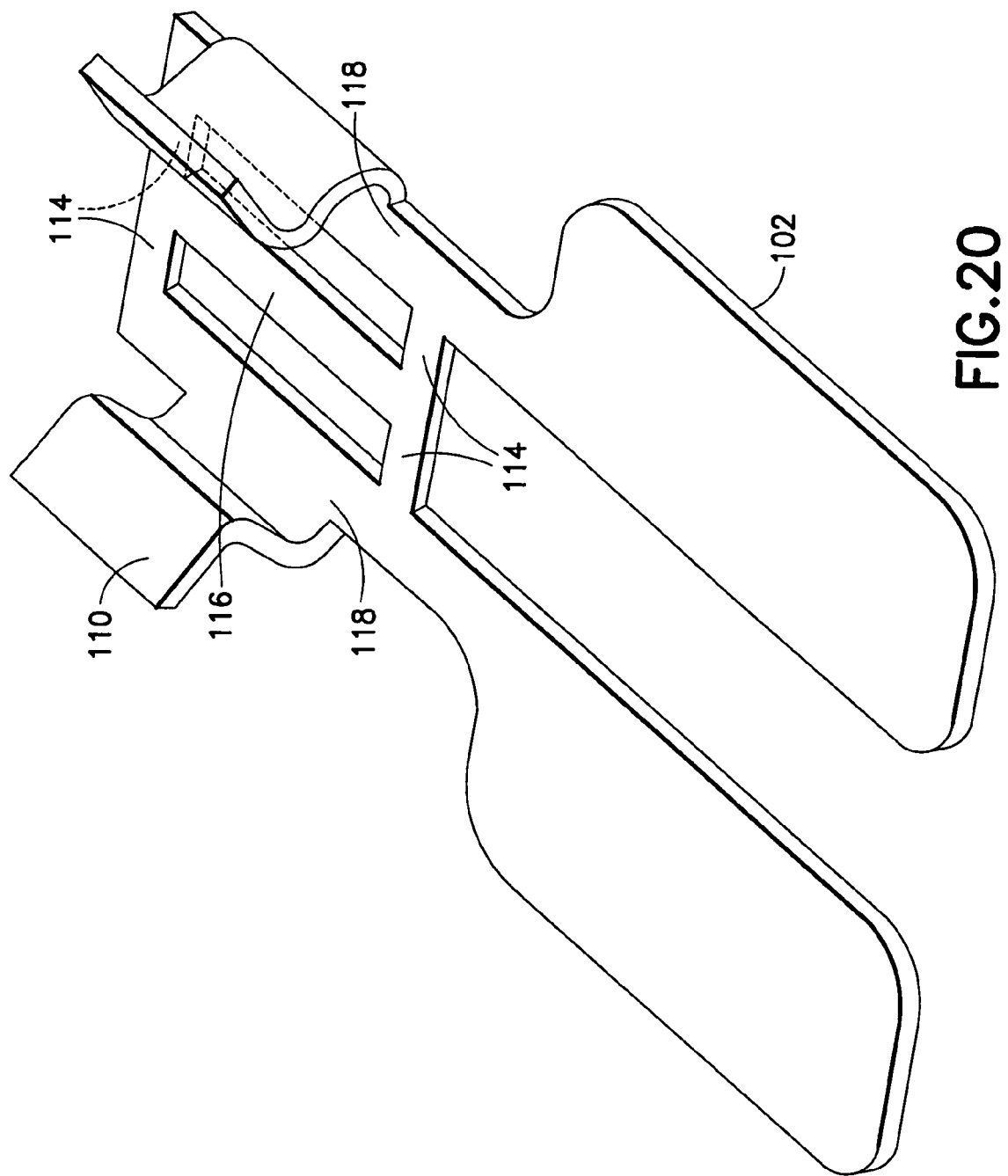
FIG. 20 is a perspective view of the lead frame of the filter assembly shown in FIG. 19 before bridging sections are removed and the housing members are overmolded onto the lead frame.
Figure 21:
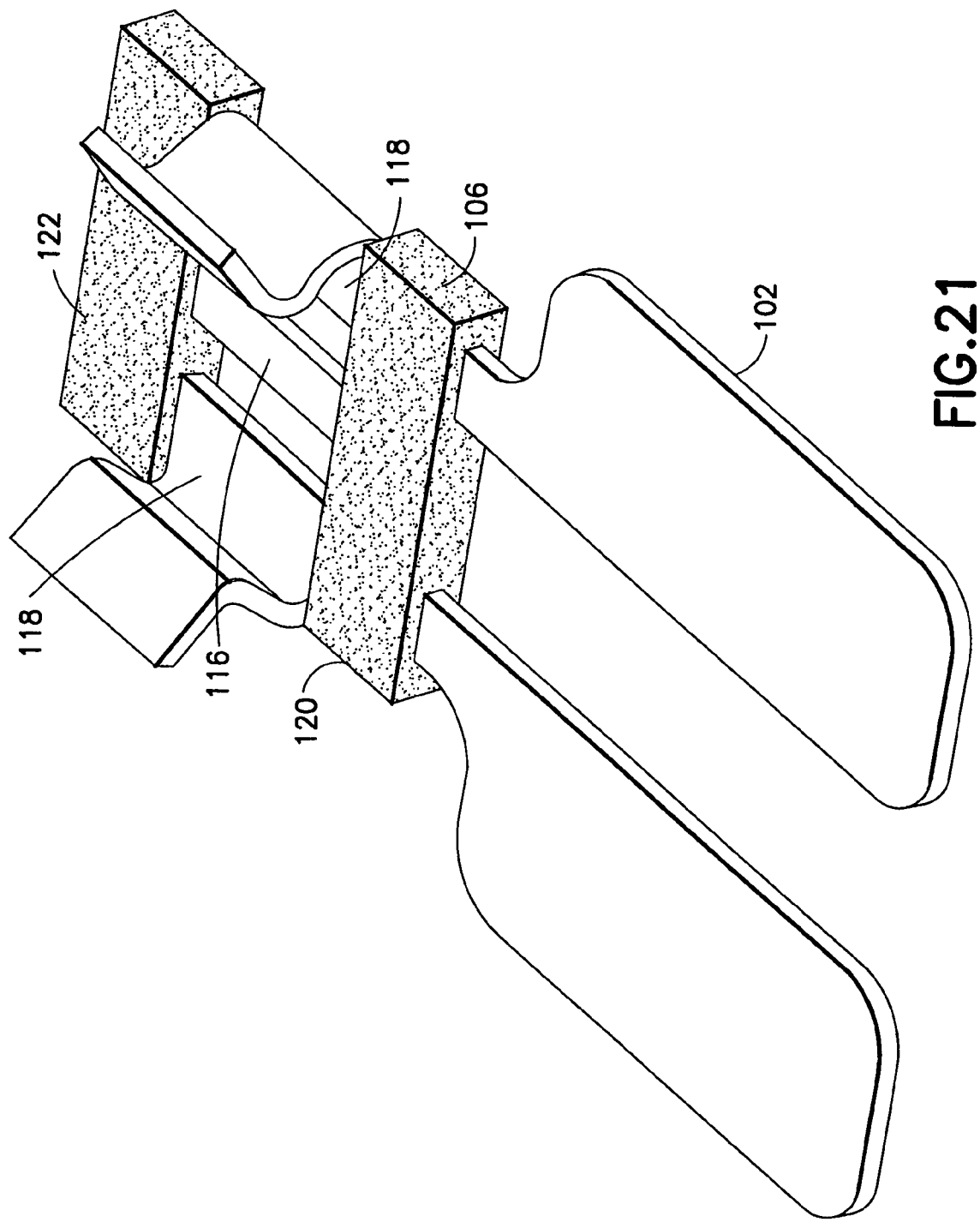
FIG. 21 is a perspective view of the lead frame as in FIG. 20 with the bridging sections removed and showing where the housing members are overmolded onto the separated lead frame sections.

As seen in FIG. 20, the lead frame is initially provided with sections 114 which connect a center strip 116 to two side strips 118 at the filter circuit mounting area 110. As seen in FIG. 21, the sections 114 are removed from the strips 116, 118 and the plastic housing members are overmolded onto areas 120, 122 to physically connect the center strip 116 to the two side strips 118. However, because the sections 114 are removed, the center strip 116 is electrically separated from and insulated from the side strips by the housing members 106 and the air gaps.

Figure 22:
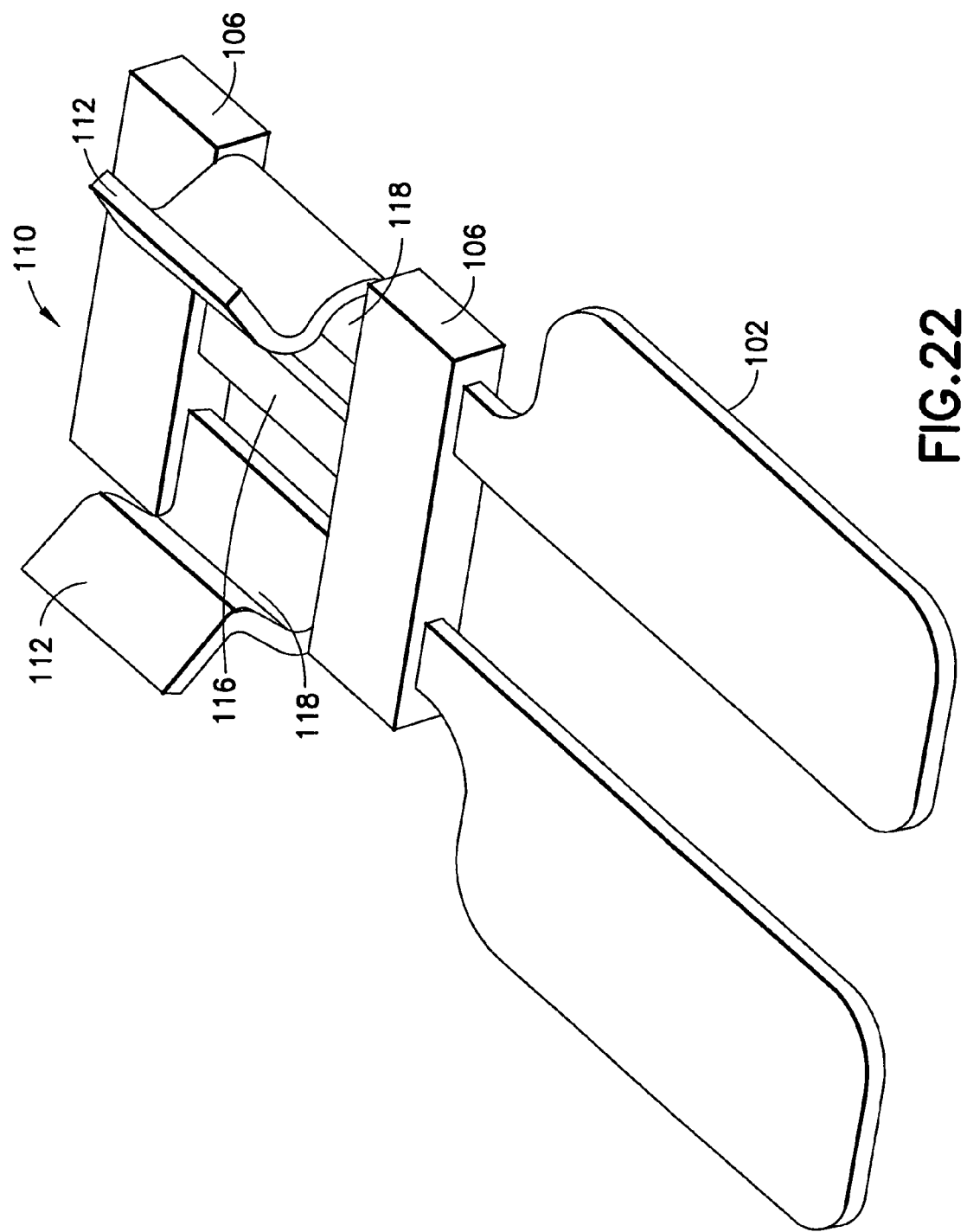
FIG. 22 is a perspective view as in FIG. 21 showing the housing members overmolded onto the lead frame to form a lead frame sub-assembly, and before the filter circuit is attached to the lead frame sub-assembly.

FIG. 22 shows the lead frame 102 and housing members 106 which form a lead frame subassembly. The filter circuit 5 can now be removably mounted in the filter circuit mounting area 110 to complete the filter assembly as shown in FIG. 19. Thus, the filter circuit does not need to be soldered to the lead frame, and the lead frame may be part of a lead frame assembly with one or more housing members. The sections 114 (see FIG. 20) form cross-members which hold together the two termination areas and the two spring contact arms before the housing members are connected to the lead frame. When sections 114 are removed, three individual terminals 108, 108, 116 are provided that are held together by the two overmolded housing members 106. This allows discrete connection of the three terminals 108, 108, 116 to a surface mount device's (SMD) terminal points (not shown).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A vehicle air bag electrical system comprising:
   an air bag control module;
   electrical conductors connected to the control module;
   an electrical connector connected to the electrical conductors, wherein the electrical connector is adapted to be connected to an air bag gas initiator; and
   a filter circuit coupled to the electrical conductors, wherein the filter circuit comprises a module having a plurality of capacitors.

2. A vehicle air bag electrical system as in claim 1 wherein the filter circuit is provided inside a housing of the air bag control module.

3. A vehicle air bag electrical system as in claim 1 wherein the filter circuit is provided adjacent an exterior side of a housing of the air bag control module.

4. A vehicle air bag electrical system as in claim 1 comprising a filter assembly with the filter circuit attached to a printed circuit board, and comprising lead frames extending from the printed circuit board and coupled to at least one of the electrical conductors.

5. A vehicle air bag electrical system as in claim 4 wherein the lead frames are directly connected to terminals of the electrical connector.

6. A vehicle air bag electrical system as in claim 1 wherein the electrical connector comprises terminals with portions that directly contact the contact areas on the filter circuit.

7. A vehicle air bag electrical system as in claim 1 further comprising a housing member overmolded onto the filter circuit.

8. A vehicle air bag electrical system as in claim 1 wherein the filter circuit is located in a front end of a housing of the electrical connector opposite a rear end of the housing where the electrical conductors enter the housing.

9. A vehicle air bag electrical system as in claim 1 wherein the filter circuit is located between female terminal sections of electrical contacts of the electrical connector, the female terminal sections being adapted to be removably connected to contacts in the air bag gas initiator.

10. A vehicle air bag electrical system as in claim 1 wherein the filter circuit is located on a cover of a housing of the electrical connector.

11. A vehicle air bag electrical connector comprising:
    a housing;
    electrical contact terminals connected to the housing;
    a filter circuit in the housing which is electrically coupled to at least one of the electrical contact terminals by a lead frame, wherein the filter circuit comprises a module with a plurality of capacitors; and wherein the filter circuit is removably connected to the lead frame.

12. A vehicle air bag electrical connector as in claim 11 wherein the filter circuit comprises a first group of capacitors coupled in series to a second group of capacitors.

13. A vehicle air bag electrical connector as in claim 12 wherein the second group of capacitors comprises only a single capacitor.

14. A vehicle air bag electrical connector as in claim 11 wherein the module comprises at least one ground terminal.

15. A vehicle air bag electrical connector as in claim 11 wherein the lead frame connects the module to only one of the electrical contact terminals.

16. A vehicle air bag electrical connector as in claim 11 wherein the lead frame connects the module to two of the electrical contact terminals.

17. A vehicle air bag electrical connector as in claim 11 wherein the filter circuit is coupled to the at least one contact terminal by a conductor wire.

18. A vehicle air bag electrical system comprising:
an air bag control module;
electrical conductors connected to the control module; and
an electrical connector as in claim 11 connected to the electrical conductors, wherein the electrical connector is adapted to be connected to an air bag gas initiator.

19. A vehicle air bag electrical connector comprising:
a housing;
electrical contact terminals connected to the housing; and
a filter assembly in the housing, wherein the filter assembly comprises a filter circuit module comprising a plurality of capacitors, and means for electrically coupling the filter circuit module to at least one electrical conductor connected to at least one of the electrical contact terminals.

* * * * *